(12) United States Patent
Shirao et al.

(10) Patent No.: US 7,987,941 B2
(45) Date of Patent: Aug. 2, 2011

(54) CONSTRUCTION VEHICLE WITH CONTROLLER FOR SUPPRESSING REDUCTION OF TRACTION FORCE UNDER LOW SPEED TRAVELING CONDITION

(75) Inventors: Atsushi Shirao, Komatsu (JP); Minoru Wada, Mooka (JP); Yuuya Kusumoto, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 94 days.

(21) Appl. No.: 12/439,407

(22) PCT Filed: Aug. 28, 2007

(86) PCT No.: PCT/JP2007/066677
§ 371 (c)(1),
(2), (4) Date: Feb. 27, 2009

(87) PCT Pub. No.: WO2008/050534
PCT Pub. Date: May 2, 2008

(65) Prior Publication Data
US 2010/0009806 A1    Jan. 14, 2010

(30) Foreign Application Priority Data
Oct. 25, 2006 (JP) ................................. 2006-289668

(51) Int. Cl.
*B60K 17/356* (2006.01)
(52) U.S. Cl. .......................................... 180/307; 477/52
(58) Field of Classification Search ................. 180/53.4, 180/53.5, 65.275, 165, 242, 305, 306, 307; 37/348; 60/487; 477/52
See application file for complete search history.

(56) References Cited

U.S. PATENT DOCUMENTS

| | | | | |
|---|---|---|---|---|
| 4,185,521 A * | 1/1980 | Beals | ................. | 477/69 |
| 4,282,933 A * | 8/1981 | Suganami et al. | ............. | 172/4.5 |
| 4,401,182 A * | 8/1983 | Pollman | ........................ | 180/242 |
| 5,337,629 A * | 8/1994 | Kita | .................................. | 477/52 |
| 5,784,867 A * | 7/1998 | McFarland et al. | ......... | 56/10.2 R |
| 6,209,675 B1 * | 4/2001 | Hayashi et al. | ................ | 180/307 |
| 6,226,987 B1 * | 5/2001 | Hayashi et al. | .................. | 60/447 |
| 6,481,333 B1 * | 11/2002 | Akasaka et al. | ................ | 92/13.6 |
| 6,612,965 B2 * | 9/2003 | Yasuoka et al. | .................. | 477/37 |
| 7,147,239 B2 * | 12/2006 | Teslak et al. | ................... | 180/306 |
| 7,246,670 B2 * | 7/2007 | Hayashi et al. | ................ | 180/6.2 |
| 7,390,282 B2 * | 6/2008 | Shah | ............................... | 477/68 |
| 7,637,101 B2 * | 12/2009 | Uezono et al. | .................. | 60/425 |
| 7,779,630 B2 * | 8/2010 | Sakamoto | ........................ | 60/445 |
| 2004/0211614 A1 * | 10/2004 | Matsuyama | .................. | 180/305 |
| 2006/0150624 A1 * | 7/2006 | Shah | ............................... | 60/445 |

(Continued)

FOREIGN PATENT DOCUMENTS
JP     03-258932 A    11/1991
(Continued)

*Primary Examiner* — J. Allen Shriver, II
*Assistant Examiner* — Brodie Follman
(74) *Attorney, Agent, or Firm* — Global IP Counselors

(57) ABSTRACT

A construction vehicle includes an engine, a hydraulic pump driven by the engine, a travel hydraulic motor driven by pressure oil discharged from the hydraulic pump, travel wheels driven by the drive force of the travel hydraulic motor, and a controller. The controller is configured to control an engine speed, displacement of the hydraulic pump, and displacement of the travel hydraulic motor in order to control a vehicle speed and traction force. The controller is further configured to increase a maximum displacement of the travel hydraulic motor as the vehicle speed decreases within a low speed range in which the vehicle speed is equal to or less than a predetermined threshold.

6 Claims, 6 Drawing Sheets

U.S. PATENT DOCUMENTS

| | | |
|---|---|---|
| 2006/0217225 A1* | 9/2006 | Hiraki et al. ............ 475/72 |
| 2008/0041049 A1* | 2/2008 | Sakamoto ............ 60/487 |
| 2008/0108467 A1* | 5/2008 | Hiraki et al. ............ 475/5 |
| 2008/0227596 A1* | 9/2008 | Schifferer ............ 477/52 |
| 2008/0318730 A1* | 12/2008 | Endo ............ 477/52 |
| 2009/0105028 A1* | 4/2009 | Hiraki et al. ............ 475/78 |
| 2009/0265065 A1* | 10/2009 | Ikari ............ 701/50 |
| 2010/0009806 A1* | 1/2010 | Shirao et al. ............ 477/52 |
| 2010/0094515 A1* | 4/2010 | Shirao et al. ............ 701/50 |

FOREIGN PATENT DOCUMENTS

| | | |
|---|---|---|
| JP | 2001-146963 A | 5/2001 |
| JP | 2004-144254 A | 5/2004 |
| JP | 2006064011 A * | 3/2006 |

* cited by examiner

CONSTRUCTION VEHICLE WITH CONTROLLER FOR SUPPRESSING REDUCTION OF TRACTION FORCE UNDER LOW SPEED TRAVELING CONDITION

CROSS-REFERENCE TO RELATED APPLICATIONS

This U.S. National stage application claims priority to Japanese Patent Application No. 2006-289668, filed in Japan on Oct. 25, 2006. The entire disclosure of Japanese Patent Application No. 2006-289668 is hereby incorporated herein by reference.

TECHNICAL FIELD

The present invention relates to a construction vehicle.

BACKGROUND ART

An example of a construction vehicle is one equipped with a so-called HST (Hydrostatic Transmission), wherein a hydraulic pump is driven by an engine and wherein a travel hydraulic motor is driven by pressure oil discharged from the hydraulic pump, thereby causing the vehicle to travel. With this type of construction vehicle, the speed and traction force of the vehicle can be controlled by controlling the engine speed, the displacement of the hydraulic pump, and the displacement of the travel hydraulic motor (Japanese Laid-open Patent Application No. 2004-144254).

SUMMARY OF THE INVENTION

Vehicle speed/traction force characteristics such as those shown in FIG. 8 are commonly obtained in an HST construction vehicle such as the one described above. In FIG. 8, the horizontal axis represents vehicle speed, and the vertical axis represents traction force. The traction force achieves a peak value not when the vehicle speed is zero, but when the vehicle speed is low, as shown by the vehicle speed/traction force characteristics. Therefore, in cases in which work is performed for pushing earth or the like at low speeds, such as excavation, the traction force decreases when the speed of the vehicle decreases to a certain speed, and there is a possibility of operability decreasing or of the vehicle stopping.

An object of the present invention is to provide a construction vehicle wherein reductions in traction force during low-speed travel can be suppressed.

The construction vehicle according to a first aspect includes an engine, a hydraulic pump driven by the engine, a travel hydraulic motor driven by pressure oil discharged from the hydraulic pump, travel wheels driven by driving force of the travel hydraulic motor, and a controller. The controller is configured to control an engine speed, displacement of the hydraulic pump, and displacement of the travel hydraulic motor in order to control a vehicle speed and traction force. At a low vehicle speed at which the vehicle speed is equal to or less than a predetermined threshold, the controller is further configured to increase the maximum displacement of the travel hydraulic motor as the vehicle speed decreases.

With this construction vehicle, in a low vehicle speed range in which the vehicle speed is equal to or less than a predetermined threshold, control is performed wherein the maximum displacement of the travel hydraulic motor is increased as the vehicle speed decreases. Since traction force increases when the maximum displacement of the travel hydraulic motor increases, performing the control described above makes it possible to suppress reductions in traction force during low-speed travel.

The construction vehicle according to a second aspect is the construction vehicle of the first aspect, wherein the controller is further configured to perform a traction force limit control for limiting the maximum traction force by limiting the maximum displacement of the travel hydraulic motor to a predetermined limit value, and to increase the maximum displacement of the travel hydraulic motor to the limit value or greater as the vehicle speed decreases when the vehicle speed is equal to or less than the predetermined threshold during the traction force limit control.

In this construction vehicle, the maximum traction force can be limited by implementing the traction force limit control. Work can thereby be performed with an appropriate maximum traction force suited to the working conditions. For example, it is possible to inhibit the occurrence of slipping by implementing the traction force limit control during work on roads of low friction.

When the vehicle speed is equal to or less than the threshold during the traction force limit control, control is performed whereby the maximum displacement of the travel hydraulic motor is increased as the vehicle speed decreases, and the maximum displacement is set to the limit value or greater. Therefore, reductions in traction force during low-speed travel can be suppressed while the traction force limit control is being implemented. The traction force can also be increased when the vehicle begins to move from a stopped state, and it is therefore possible to suppress the occurrence of slipping when the vehicle begins to move under a high load.

The construction vehicle according to a third aspect is the construction vehicle of the second aspect, wherein the controller is configured to vary the limit value of the maximum displacement of the travel hydraulic motor during the traction force limit control, and to establish the predetermined threshold for each set limit value.

In this construction vehicle, since the limit value of the maximum displacement of the travel hydraulic motor can be varied, it is possible to set an appropriate maximum traction force suited to the situation. Since the vehicle speed/traction force characteristics differ according to the limit value of the maximum displacement of the travel hydraulic motor, it is possible to more appropriately suppress reductions in the traction force during low-speed travel by establishing a threshold with each set limit value.

The construction vehicle according to a fourth aspect is the construction vehicle of any of the first through third aspects, wherein the controller is further configured to perform a slip reduction control for reducing the upper limit of engine speed as the vehicle speed decreases when the vehicle speed is equal to or less than a predetermined vehicle speed, and to increase the maximum displacement of the travel hydraulic motor as the vehicle speed decreases when the vehicle speed is equal to or less than the threshold during the slip reduction control.

In this construction vehicle, it is possible to ensure that the maximum traction force is achieved at a lower vehicle speed, by reducing the upper limit of the engine speed as the vehicle speed decreases during the slip reduction control. It is thereby possible to inhibit slipping during work on roads of low friction. Since there is a limit to reducing the upper limit of the engine speed even in cases in which the slip reduction control is performed, there is also a limit to reducing the vehicle speed at which the maximum traction force is achieved. Specifically, the maximum traction force is achieved at a certain vehicle speed, and there is a tendency for the traction force to decrease at this vehicle speed or lower even if the slip reduction control is implemented. Therefore, it is possible to further suppress reductions in traction force during low-speed travel by performing the slip reduction control together with the control for increasing the maximum displacement of the travel hydraulic motor as the vehicle speed decreases, and setting the maximum displacement to the limit value or greater.

DETAILED DESCRIPTION OF THE INVENTION

Overall Configuration

Figure 1:
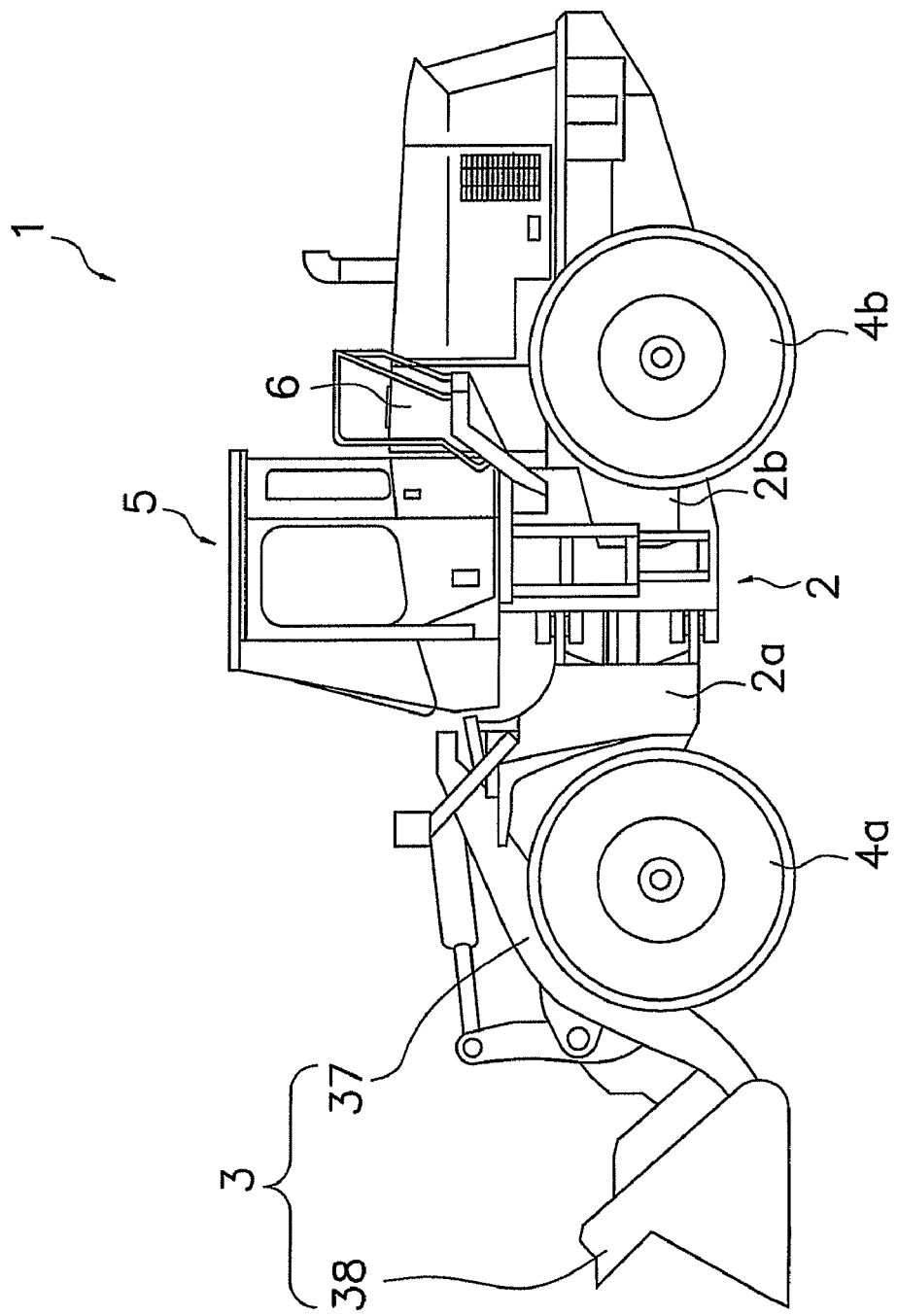
FIG. 1 is a side view of the construction vehicle.

A side view of a construction vehicle 1 according to an embodiment of the present invention is shown in FIG. 1. The construction vehicle 1 is a wheel loader capable of self-propulsion by means of tires 4a, 4b, and also capable of using a work device 3 to perform desired work. The construction vehicle 1 comprises a vehicle frame 2, a work device 3, tires 4a, 4b, and a driver cabin 5.

The vehicle frame 2 has a front frame 2a disposed on the front side and a rear frame 2b disposed on the rear side, and the front frame 2a and rear frame 2b are coupled in the center of the vehicle frame 2 and are capable of swinging to the left and right.

Figure 2:
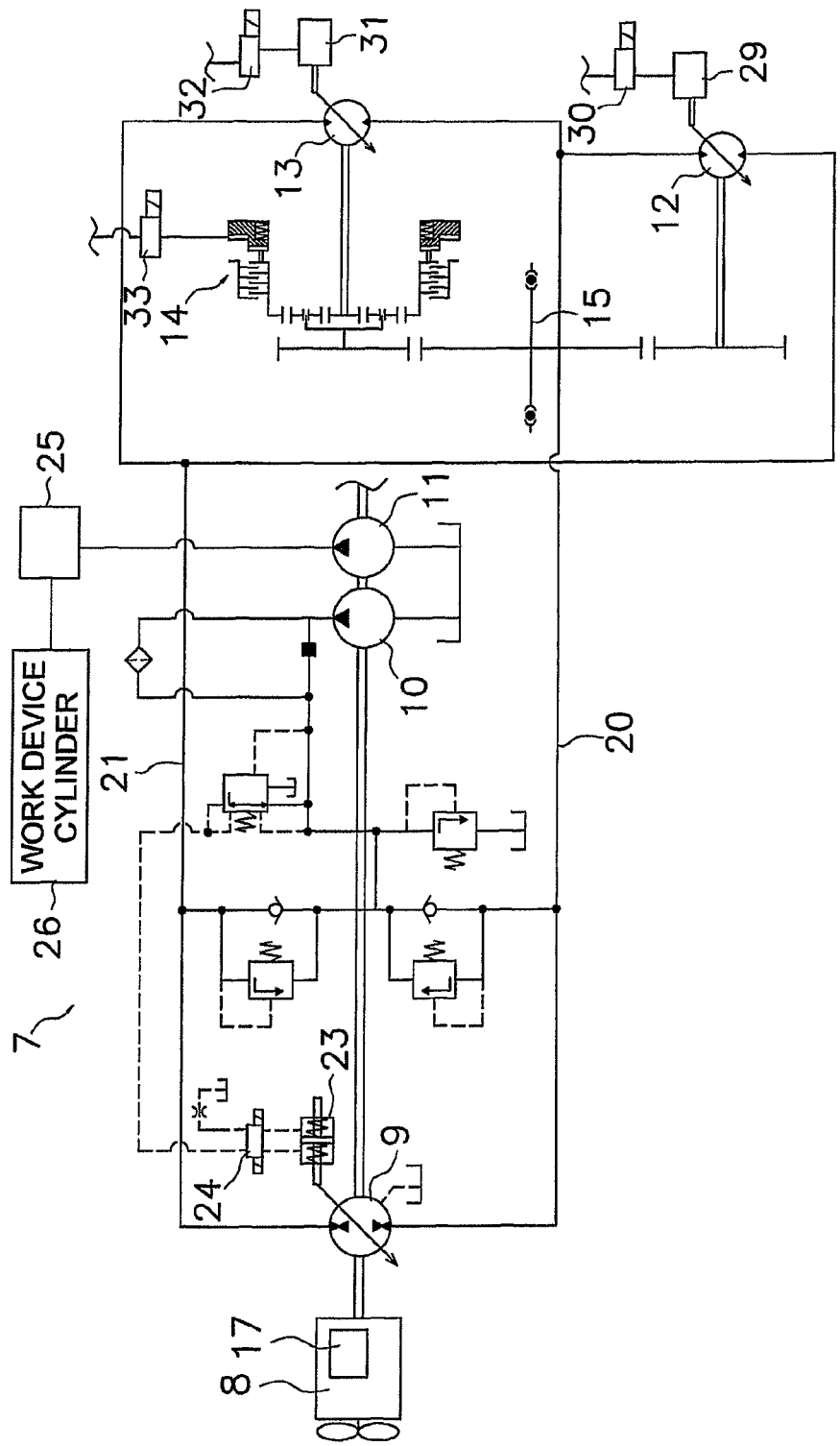
FIG. 2 is a schematic diagram showing the configuration of the hydraulic drive mechanism.

The work device 3 and a pair of front tires 4a are attached to the front frame 2a. The work device 3 is a device driven by pressure oil from a work device hydraulic pump 11 (see FIG. 2), and the work device has lift arms 37 mounted to the front part of the front frame 2a, a bucket 38 attached to the distal ends of the lift arms 37, and a work device cylinder 26 (see FIG. 2) for driving these components. The pair of front tires 4a is provided to the side surfaces of the front frame 2a.

The driver cabin 5, a hydraulic fluid tank 6, a pair of rear tires 4b, and other components are provided to the rear frame 2b. The driver cabin 5 is placed at the top part of the vehicle frame 2, and inside the driver cabin are installed a steering wheel, an acceleration pedal, and other operational components; a display unit for displaying the vehicle speed and other various types of information, a driver seat, and the like. The hydraulic fluid tank 6 is disposed behind the driver cabin 5, and the hydraulic fluid tank 6 stores hydraulic fluid pressurized by various hydraulic pumps. The pair of rear tires 4b is provided on the side surfaces of the rear frame 2b.

A hydraulic drive mechanism 7 for driving the tires 4a, 4b and the work device 3 is installed on the vehicle frame 2. The configuration of the hydraulic drive mechanism 7 is described hereinbelow with reference to FIG. 2.

Hydraulic Drive Mechanism 7

Figure 3:
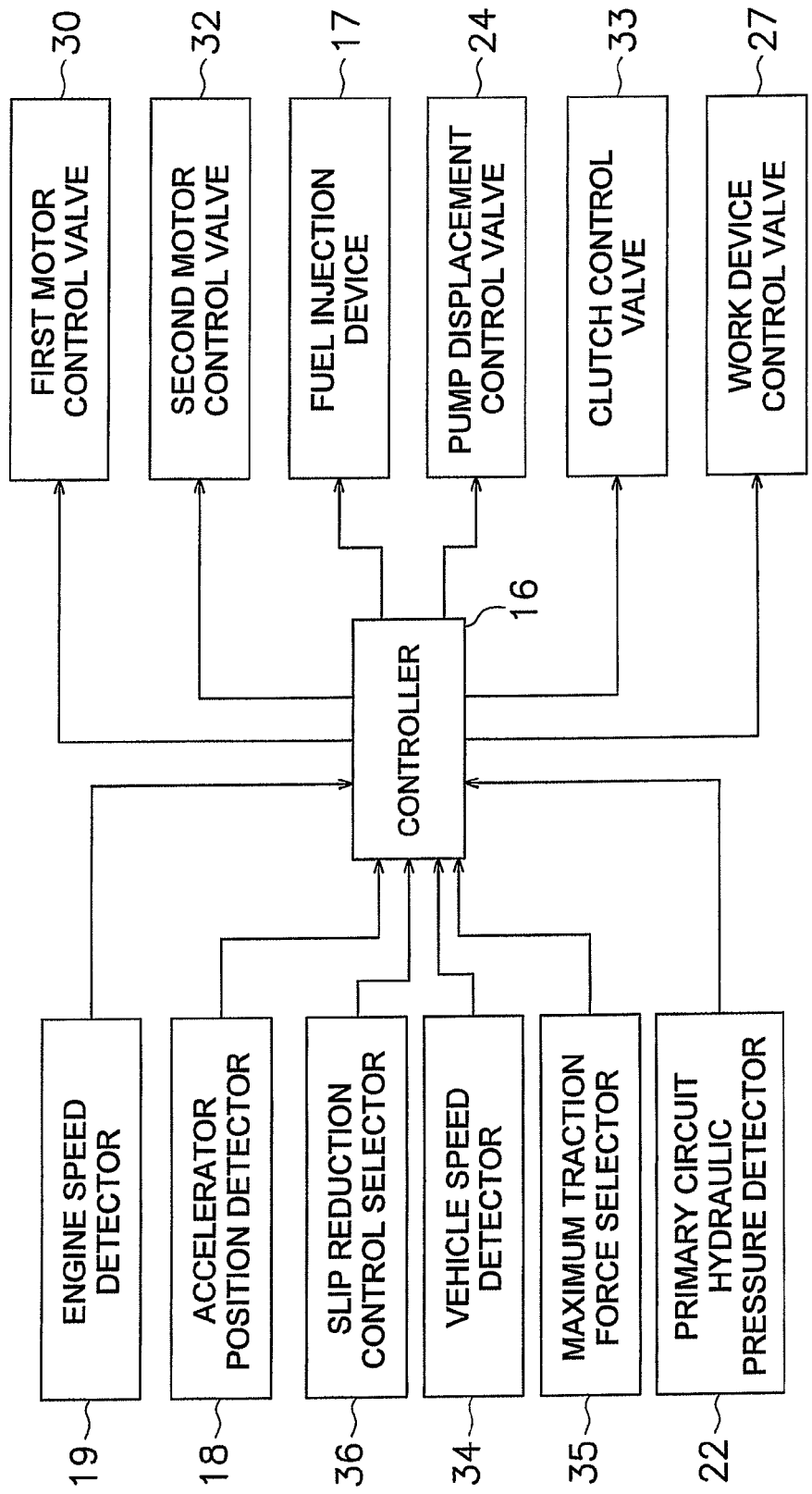
FIG. 3 is a control block diagram of the construction vehicle.

The hydraulic drive mechanism 7 has primarily an engine 8, a main pump 9, a charge pump 10, the work device hydraulic pump 11, a first travel motor 12, a second travel motor 13, a clutch 14, a drive shaft 15, and a controller 16 (see FIG. 3), and uses a so-called HST system.

The engine 8 is a diesel engine, and the output torque generated by the engine 8 is transmitted to the main pump 9, the charge pump 10, the work device hydraulic pump 11, a steering hydraulic pump (not shown), and other components. The engine 8 is equipped with a fuel injection device 17 for controlling the output torque and rotational speed of the engine 8, and the fuel injection device 17 adjusts the throttle position in accordance with the amount by which the accelerator is operated (hereinbelow referred to as the "accelerator position") and adjusts the sprayed amount of fuel. The accelerator is a device for indicating the target rotational speed of the engine 8, and is provided with an accelerator position detector 18 (see FIG. 3). The accelerator position detector 18 is configured from a potentiometer, and the accelerator position detector 18 detects the accelerator position. The accelerator position detector 18 sends a position signal indicating the accelerator position to the controller 16, and a control signal is outputted from the controller 16 to the fuel injection device 17. Therefore, the operator can control the rotational speed of the engine 8 by adjusting the amount by which the accelerator is operated. The engine 8 is also provided with an engine speed detector 19 (see FIG. 3) composed of a rotation sensor for detecting the actual rotational speed of the engine 8, and a rotational speed signal from the engine speed detector 19 is inputted to the controller 16.

The main pump 9 is a variable displacement hydraulic pump driven by the engine 8, and pressure oil discharged from the main pump 9 is sent to the first travel motor 12 and the second travel motor 13 through primary circuits 20, 21. The hydraulic drive mechanism 7 is provided with a primary circuit hydraulics pressure detector 22 (see FIG. 3) for detecting the pressure (hereinbelow referred to as "primary circuit hydraulics pressure") of the pressure oil passing through the primary circuits 20, 21. The primary circuit hydraulics pressure is equivalent to drive hydraulics pressure of the pressure oil for driving the first travel motor 12 and the second travel motor 13. A pump displacement control cylinder 23 and a pump displacement control valve 24 for controlling the displacement of the main pump 9 are connected to the main pump 9. The pump displacement control valve 24 is an electromagnetic control valve for controlling the pump displacement control cylinder 23 on the basis of a control signal from the controller 16, and the displacement of the main pump 9 can be arbitrarily varied by controlling the pump displacement control cylinder 23.

The charge pump 10 is a pump for supplying pressure oil to the primary circuits 20, 21, the charge pump being driven by the engine 8. The charge pump 10 supplies pressure oil to the pilot circuit of the main pump 9.

The work device hydraulic pump 11 is driven by the engine 8, the pressure oil discharged from the work device hydraulic pump 11 is fed to the work device cylinder 26 of the work device 3 via a work device hydraulic circuit 25, and the work device cylinder 26 is driven. The work device hydraulic circuit 25 is provided with a work device control valve 27 (see FIG. 3) for controlling the work device cylinder 26, and the work device control valve 27 is controlled based on a control signal from the controller 16, whereby the work device cylinder 26 is controlled.

The first travel motor 12 is a variable displacement hydraulic motor and is driven by pressure oil discharged from the main pump 9 to generate drive force for travelling. The first travel motor 12 is provided with a first motor cylinder 29 for controlling the tilt angle of the first travel motor 12, and a first motor control valve 30 (see FIG. 3) for controlling the first motor cylinder 29. The first motor control valve 30 is an electromagnetic control valve controlled based on a control signal from the controller 16, and the displacement of the first travel motor 12 can be arbitrarily varied by controlling the first motor cylinder 29.

The second travel motor 13 is a variable displacement hydraulic motor driven by pressure oil discharged from the main pump 9, similar to the first travel motor 12, and the second travel motor 13 causes the drive shaft 15 to generate drive force for travelling. The second travel motor 13 is provided in parallel with the first travel motor 12 over the hydraulic circuit. The second travel motor 13 is provided with a second motor cylinder 31 for controlling the tilt angle of the second travel motor 13, and a second motor control valve 32 (see FIG. 3) for controlling the second motor cylinder 31. The second motor control valve 32 is an electromagnetic control valve controlled based on a control signal from the controller 16, and the displacement of the second travel motor 13 can be arbitrarily varied by controlling the second motor cylinder 31. The maximum tilt angle and minimum tilt angle can be adjusted by adjusting the control signal sent to the second motor control valve 32.

The clutch 14 is a device for switching between transmission and non-transmission of drive force from the second travel motor 13 to the drive shaft 15. The clutch 14 is also provided with a clutch control valve 33 (see FIG. 3) for switching the clutch 14 between being engaged and being disengaged. The clutch control valve 33 is an electromagnetic control valve for switching the clutch 14 between being engaged and being disengaged based on a control signal from the controller 16. During low-speed travel, the clutch 14 is set so as to be engaged, and the drive forces of the first travel motor 12 and the second travel motor 13 are transmitted to the drive shaft 15. During high-speed travel, the clutch 14 is set so as to be disengaged, and only the drive force of the first travel motor 12 is transmitted to the drive shaft 15.

The drive shaft 15 causes the tires 4a, 4b to rotate by means of the transmission of drive force from the first travel motor 12 and second travel motor 13 to the tires 4a, 4b (see FIG. 1). The drive shaft 15 is also provided with a vehicle speed detector 34 (see FIG. 3) composed of a vehicle speed sensor for detecting the vehicle speed from the rotational speed of the drive shaft 15, and a vehicle speed signal from the vehicle speed detector 34 is inputted to the controller 16.

Figure 4:
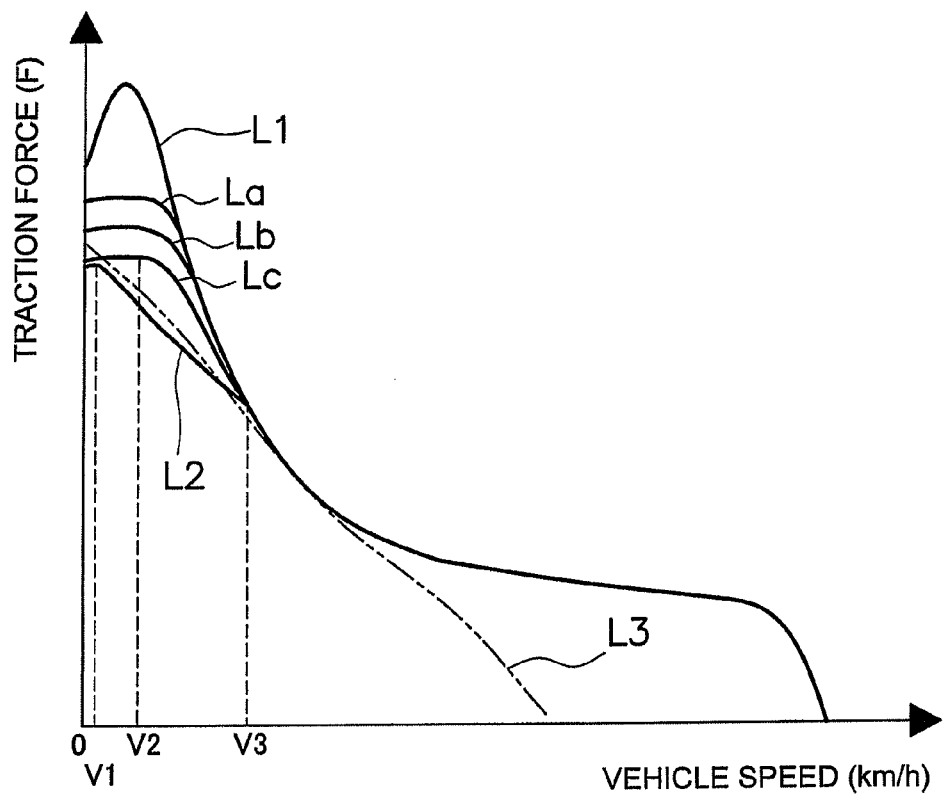
FIG. 4 is a graph showing the vehicle speed/traction force characteristics.

The controller 16 electronically controls the control valves and the fuel injection device 17 on the basis of output signals from the detectors, and the controller can control the engine speed, the displacement of the hydraulic pumps 9 to 11, the displacement of the travel motors 12, 13, and other factors. The traction force and vehicle speed thereby vary continuously in the construction vehicle 1 as shown in FIG. 4, and the vehicle speed can automatically change from zero to the maximum vehicle speed without a speed-changing operation. The control of the travel motors 12, 13 by means of the controller 16 is described in detail hereinbelow.

Control of Travel Motors

Figure 5:
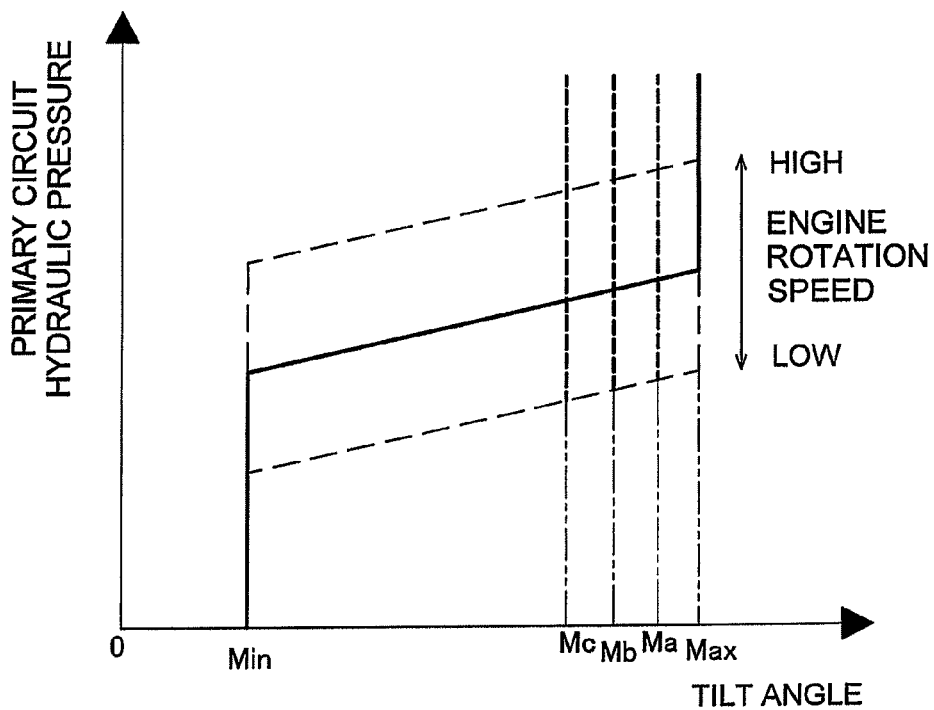
FIG. 5 is a graph showing the relationship between the tilt angle, the primary circuit hydraulics pressure, and the engine speed.

The controller 16 processes the output signals from the engine speed detector 19 and the primary circuit hydraulic pressure detector 22 and outputs commands to change the tilt angle to the travel motors 12, 13. FIG. 5 shows the relationship between tilt angle, primary circuit hydraulics pressure, and engine speed. The solid line in FIG. 5 is a line in which the tilt angle in relation to the primary circuit hydraulics pressure is established, when the engine speed is at a certain value. The tilt angle is at a minimum (Min) while the primary circuit hydraulics pressure is at a specific value or less, then the tilt angle gradually increases (slanted portion of the solid line) as the primary circuit hydraulics pressure increases, and after the tilt angle has reached a maximum (Max), the tilt angle remains at the maximum tilt angle Max even if the hydraulics pressure rises.

The slanted portion of the solid line is set so as to increase and decrease according to the engine speed. Specifically, if the engine speed is low, the tilt angle increases from a state of lower primary circuit hydraulics pressure, and the tilt angle is controlled so as to reach the maximum tilt angle in the state of lower primary circuit hydraulics pressure (refer to the slanted portion of the lower dashed line in FIG. 5). Conversely, if the engine speed is high, the tilt angle remains at the minimum tilt angle Min until the primary circuit hydraulics pressure increases further, and the tilt angle is controlled so as to reach the maximum tilt angle Max in a state of higher primary circuit hydraulics pressure (refer to the slanted portions of the upper dashed line in FIG. 5).

Traction Force Limit Control

The construction vehicle 1 has a maximum traction force selector 35 (see FIG. 3), and the controller 16 implements traction force limit control, wherein the maximum traction force is limited by the operation of the maximum traction force selector 35. The maximum traction force selector 35 is a switch provided in the driver cabin 5. The controller 16 switches the maximum value of the tilt angle of the second travel motor 13 on the basis of an output signal from the maximum traction force selector 35 and limits the maximum displacement of the second travel motor 13 to a predetermined limit value, thereby limiting the maximum traction force. In the construction vehicle 1, the maximum traction force selector 35 can be switched between an ON state and an OFF state. The maximum traction force in the ON state can be varied between three levels: level A, level B, and level C. When the maximum traction force selector 35 is in the OFF state, the maximum tilt angle (the upper-limit displacement) is at the Max position in FIG. 5, and the vehicle speed/traction force characteristics in this state are represented by the graph L1 in FIG. 4. This maximum tilt angle Max corresponds to a maximum value (the ceiling displacement) of the performance of the second travel motor 13. When the maximum traction force selector 35 is turned to the ON state, the maximum tilt angle (the upper-limit displacement) is changed to an extent corresponding with the level of the set maximum traction force. Specifically, the maximum tilt angle changes to Ma when the maximum traction force in the ON state is set to level A. Similarly, when the maximum traction force is set to level B, the maximum tilt angle changes to Mb, and when the maximum traction force is set to level C, the maximum tilt angle changes to Mc. Thus, the maximum tilt angle changes to Ma, Mb, and Mc, which are less than Max, resulting in vehicle speed/traction force characteristics in which the maximum traction force has decreased, such as in graphs La, Lb, and Lc in FIG. 4. Graphs L1, La, Lb, and Lc all represent vehicle speed/traction force characteristics in states in which the accelerator position is fully open. It is thereby possible to suppress the drive force of the tires 4a, 4b to prevent slipping, even when the accelerator position is set to maximum in order to ensure an amount of work by the work device 3 on soft roads, snowy roads, or other roads having low friction.

Slip Reduction Control

The construction vehicle 1 has a slip reduction control selector 36, and the operator can implement slip reduction control by operating the slip reduction control selector 36. Slip reduction control is a control whereby the occurrence of slipping can be better suppressed by changing the upper limit of the engine speed in accordance with the vehicle speed. The slip reduction control selector 36 is a switch provided in the driver cabin 5, and can be switched between an ON state and an OFF state. When the slip reduction control selector 36 is set to the ON state, the slip reduction control described hereinbelow is performed.

Figure 6:
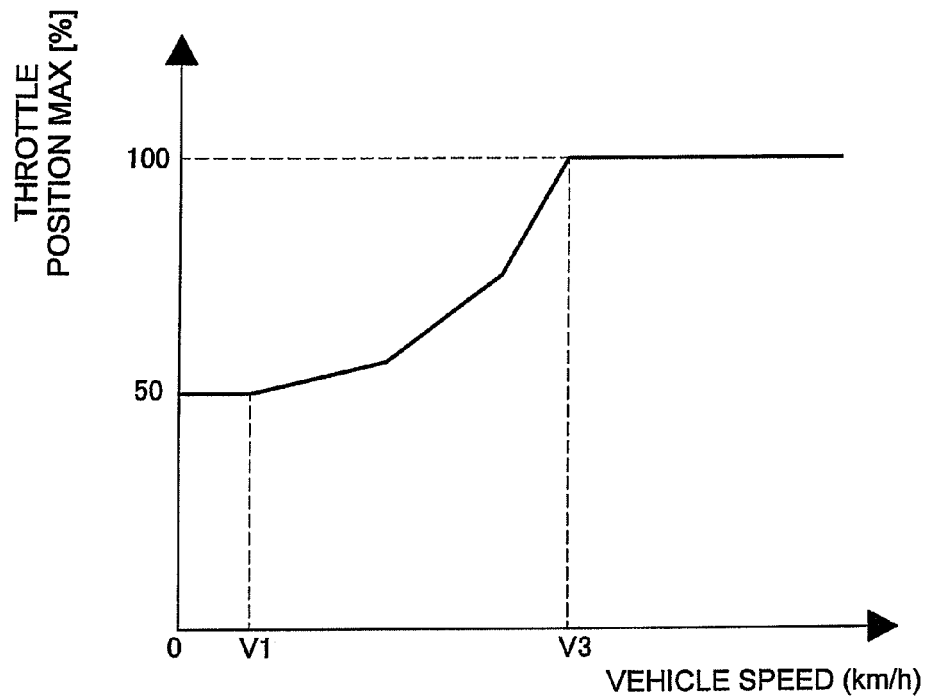
FIG. 6 is a graph showing the upper limit of the throttle position (the upper limit of the engine speed) in relation to the vehicle speed.

In the slip reduction control, the vehicle speed is first detected, and an upper limit of the engine speed is established based on the detected vehicle speed. The controller 16 herein establishes the upper limit of the engine speed on the basis of the graph shown in FIG. 6. In this graph, the upper limit of the throttle position is set in relation to the vehicle speed, and at a predetermined vehicle speed V3 or lower, the upper limit of the throttle position decreases as the vehicle speed decreases. The controller 16 limits the upper limit of the engine speed by limiting the upper limit of the throttle position in accordance with this table. The controller 16 thereby can control the upper limit of the engine speed so that the vehicle speed/traction force characteristics at low speeds resemble the vehicle speed/traction force characteristics of a vehicle equipped with a torque converter (see graph L3), as shown by the graph L2 in FIG. 4. The vehicle speed/traction force characteristics of a vehicle equipped with a torque converter are a monotonically decreasing function, and the maximum traction force is at maximum when the vehicle speed is zero. The graph Lc represents the vehicle speed/traction force characteristics (accelerator position 100%) in cases in which the upper limit of the engine speed is set at a constant without performing slip reduction control, even at low speeds. The graph L2 represents the vehicle speed/traction force characteristics when the slip reduction control is performed together with the level C traction force limit control. In the graph L2, the maximum traction force is exhibited at a lower speed than the maximum traction force in the vehicle speed/traction force characteristics shown in the graph Lc. Specifically, the vehicle speed V1, at which the maximum traction force is exhibited in the vehicle speed/traction force characteristics when the slip reduction control is performed, is less than the vehicle speed V2, at which the maximum traction force is exhibited in the vehicle speed/traction force characteristics (see Lc) when the slip reduction control is not performed. The vehicle speed V1 is 1 km/h, for example. The limitation of the upper limit of the engine speed by the slip reduction control is performed in cases in which the primary circuit hydraulics pressure is equal to or greater than the pressure at which the tilt angle of the second travel motor 13 reaches the maximum tilt angle; or, to explain through FIG. 4, in cases in which the vehicle speed is lower than the vehicle speed V3.

When the slip reduction control selector 36 is set to the OFF state, the controller 16 ends the slip reduction control.

Travel Motor Control at Low Speed Range

The following is a description of controlling the second travel motor 13 at low speed ranges, which is characteristic of the present invention.

Figure 7:
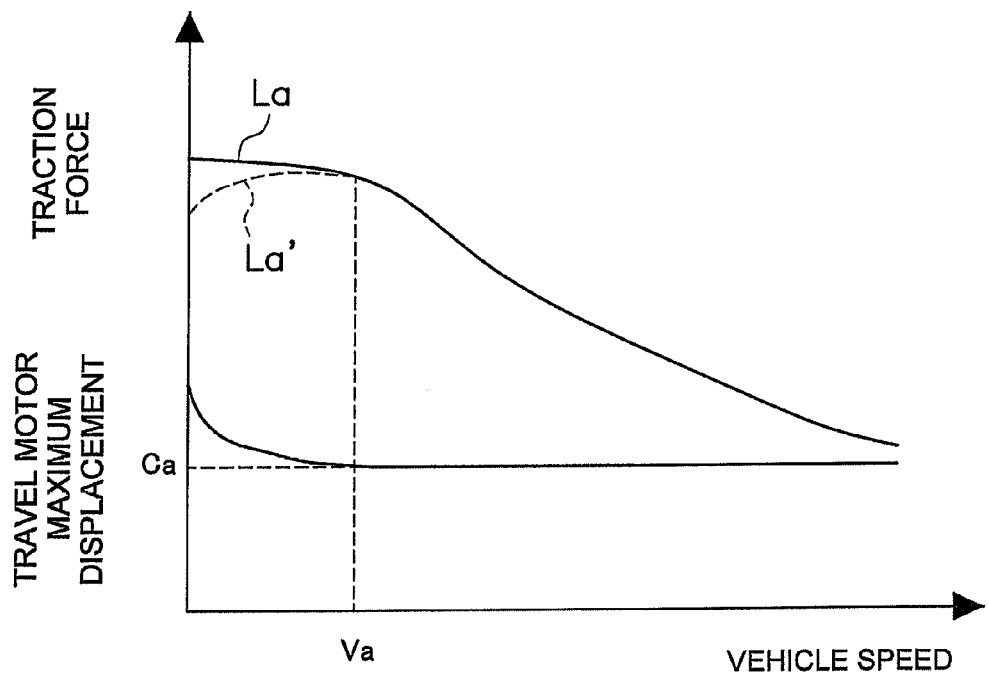
FIG. 7 is a graph showing the maximum displacement of the second travel motor and maximum traction force in relation to the vehicle speed.
Figure 8:
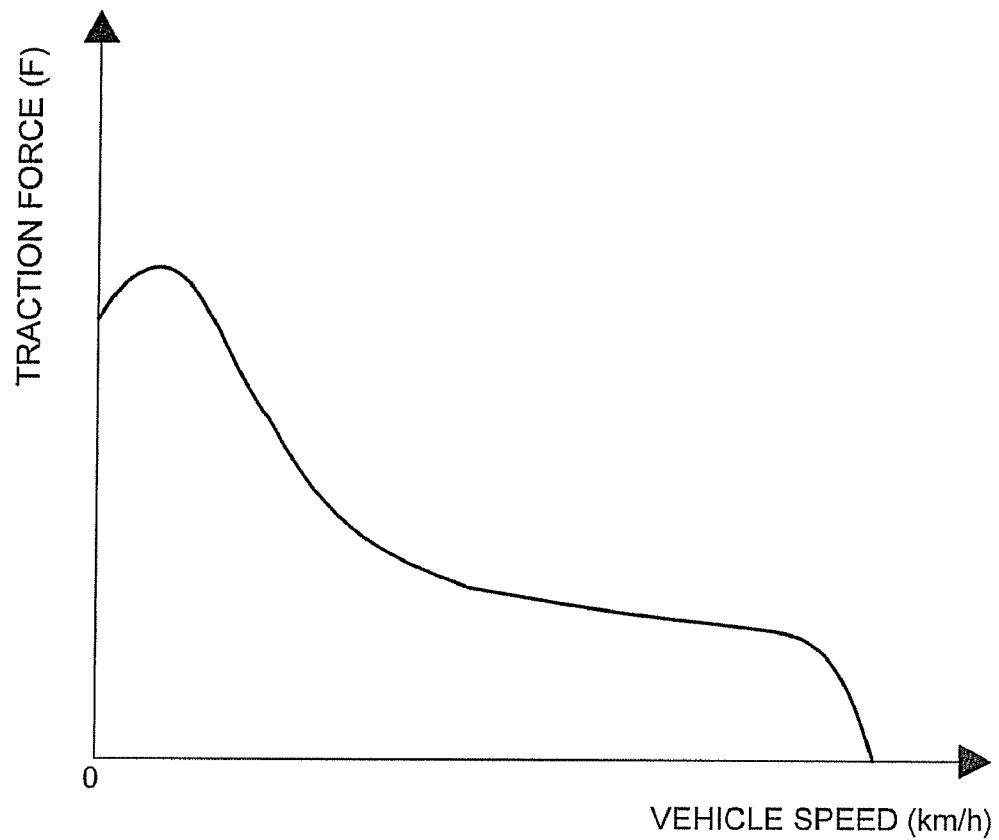
FIG. 8 is a graph showing the vehicle speed/traction force characteristics of a conventional construction vehicle.

In cases in which the traction force limit control described above is performed, and also in cases in which the slip reduction control is performed, the controller 16 performs control for increasing the maximum displacement of the second travel motor 13 as the vehicle speed decreases, when the vehicle speed is in a low range equal to or less than a predetermined threshold. For example, in cases in which the level A traction force limit control is performed, the maximum displacement of the second travel motor 13 is at Ca when the vehicle speed is equal to or greater than a predetermined threshold Va, but when the vehicle speed is within a range between zero and the predetermined threshold Va, the maximum displacement of the second travel motor 13 increases in quadratic function as the vehicle speed decreases, and the maximum displacement is equal to or greater than Ca, as shown in FIG. 7. The maximum displacement Ca is the displacement that corresponds to the maximum tilt angle Ma described above. Control for increasing the maximum displacement of the second travel motor 13 as the vehicle speed decreases in a range of a predetermined threshold or less is also similarly performed in cases in which the level B traction force limit control is performed, cases in which the level C traction force limit control is performed, and cases in which the slip reduction control is performed. The values used as the thresholds are values corresponding to each level, i.e., values established with each limit value of the maximum displacement of the second travel motor 13 set for each control. It is assumed that Vb is the threshold when the level B traction force limit control is performed, Vc is the threshold when the level C traction force limit control is performed, and Vd is the threshold when the slip reduction control is performed. In this case, the values used for the thresholds Va, Vb, Vc, and Vd are values appropriately established in advance based on various control factors. For example, the thresholds Va, Vb, and Vc are all different values, wherein Va<Vb<Vc.

Characteristics (1) In the construction vehicle 1, control is performed whereby the maximum displacement of the second travel motor 13 increases as the vehicle speed decreases when the vehicle speed is within a low speed range of a predetermined threshold or less. For example, the vehicle speed/traction force characteristics in cases in which the level A traction force limit control is performed are shown in the graph La in FIG. 7. In FIG. 7, the graph La' represents the vehicle speed/traction force characteristics in cases in which conventional control is performed with the maximum displacement of the second travel motor 13 being constant. Thus, in the construction vehicle 1, control is performed whereby the maximum displacement of the second travel motor 13 increases as the vehicle speed decreases when the vehicle speed is at the threshold Va or lower; therefore, reductions in traction force during low-speed travel can be better suppressed than in cases in which the maximum displacement of the second travel motor 13 is constant. It is thereby possible to reduce the fear that traction force will be reduced thereby reducing operability or causing the vehicle to stop, when clearing work is being performed with the bucket 38. Occurrences of slipping when the vehicle begins moving can also be reduced even when the vehicle begins moving under high loads, because a traction force near to the maximum traction force can be ensured.

(2) In the construction vehicle, thresholds Va to Vd corresponding to the levels of the traction force limit control and to the slip reduction control are used for controlling the second travel motor 13 at low speeds, as described above. It is thereby possible to perform appropriate control corresponding to the traction force/vehicle speed characteristics with each control, and to more appropriately suppress reductions in traction force during low-speed travel with each control.

Other Embodiments (A) In the embodiment described above, the maximum traction force while the maximum traction force selector 35 is in on state could be varied among three levels: level A, level B, and level C, but other possible options are to vary the maximum traction force among two or fewer levels or four or more levels, or to vary the maximum traction force continuously.

(B) In the embodiment described above, the present invention is applied to a wheel loader, but the present invention is not limited to a wheel loader and can be applied to any construction vehicle that travels by means of a hydraulic motor.

The present invention is also not limited to a vehicle that travels by means of two hydraulic motors such as the construction vehicle 1 in the embodiment described above, and may also be applied to a vehicle that travels by means of one hydraulic motor.

The present invention has the effect of making it possible to suppress reductions in traction force during low-speed travel, and the present invention is useful as a construction vehicle.

The invention claimed is:

1. A construction vehicle comprising:
an engine;
a hydraulic pump configured and arranged to be driven by the engine;
a travel hydraulic motor configured and arranged to be driven by pressure oil discharged from the hydraulic pump;
a primary circuit through which the pressure oil flows from the hydraulic pump to the travel hydraulic motor;
travel wheels configured and arranged to be driven by drive force of the travel hydraulic motor; and
a controller configured to control an engine speed, displacement of the hydraulic pump, and displacement of the travel hydraulic motor in order to control a vehicle speed and traction force, the controller being configured to vary the displacement of the travel hydraulic motor between an upper-limit displacement and a lower-limit displacement according to a pressure of the pressure oil in the primary circuit with the upper-limit displacement being set to be equal to or smaller than a ceiling displacement determined based on performance of the hydraulic motor, the controller being further configured to increase the upper-limit displacement of the travel hydraulic motor as the vehicle speed decreases in a low vehicle speed range from zero to a predetermined threshold to obtain vehicle speed/traction force characteristics with which a maximum traction force is substantially maintained in the low vehicle speed range.

2. The construction vehicle according to claim 1, wherein the controller is further configured to perform a traction force limit control for limiting the maximum traction force by limiting the maximum displacement of the travel hydraulic motor to a predetermined limit value, and to increase the maximum displacement of the travel hydraulic motor to the limit value or greater as the vehicle speed decreases when the vehicle speed is equal to or less than the predetermined threshold during the traction force limit control.

3. The construction vehicle according to claim 2, wherein the controller is further configured to vary the upper-limit displacement of the travel hydraulic motor during the traction force limit control, and to establish the predetermined threshold of the vehicle speed for each of the upper-limit displacement.

4. The construction vehicle according to claim 1, wherein the controller is further configured to perform a slip reduction control for reducing an upper limit of the engine speed as the vehicle speed decreases when the vehicle speed is equal to or less than a predetermined speed, and to increase the upper-limit displacement of the travel hydraulic motor as the vehicle speed decreases when the vehicle speed is equal to or less than the predetermined threshold during the slip reduction control.

5. The construction vehicle according to claim 2, wherein the controller is further configured to perform a slip reduction control for reducing an upper limit of the engine speed as the vehicle speed decreases when the vehicle speed is equal to or less than a predetermined speed, and to increase the upper-limit displacement of the travel hydraulic motor as the vehicle speed decreases when the vehicle speed is equal to or less than the predetermined threshold during the slip reduction control.

6. The construction vehicle according to claim 3, wherein the controller is further configured to perform a slip reduction control for reducing an upper limit of the engine speed as the vehicle speed decreases when the vehicle speed is equal to or less than a predetermined speed, and to increase the upper-limit displacement of the travel hydraulic motor as the vehicle speed decreases when the vehicle speed is equal to or less than the predetermined threshold during the slip reduction control.

* * * * *